(12) United States Patent
Nakayama et al.

(10) Patent No.: US 11,878,576 B2
(45) Date of Patent: Jan. 23, 2024

(54) VEHICLE DOOR STRUCTURE

(71) Applicant: Mazda Motor Corporation, Hiroshima (JP)

(72) Inventors: Daisuke Nakayama, Hiroshima (JP); Kyohei Yukita, Hiroshima (JP); Tomohiro Komaji, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/862,403

(22) Filed: Jul. 12, 2022

(65) Prior Publication Data
US 2023/0029078 A1 Jan. 26, 2023

(30) Foreign Application Priority Data

Jul. 26, 2021 (JP) .................................. 2021-121513

(51) Int. Cl.
*B60J 5/04* (2006.01)
(52) U.S. Cl.
CPC .................................. *B60J 5/0423* (2013.01)
(58) Field of Classification Search
CPC ...... B60J 5/0423; B60J 5/0425; B60J 5/0429; B60J 5/0448
See application file for complete search history.

(56) References Cited

U.S. PATENT DOCUMENTS

| | | | |
|---|---|---|---|
| 7,331,626 B2 * | 2/2008 | Yoshimoto | B62D 25/04 296/187.12 |
| 8,042,860 B2 * | 10/2011 | Takahashi | B60J 5/0437 296/146.6 |
| 2008/0185850 A1 * | 8/2008 | Takaya | E05B 79/04 70/237 |
| 2019/0176588 A1 | 6/2019 | Jeon et al. | |

FOREIGN PATENT DOCUMENTS

| | | | | |
|---|---|---|---|---|
| DE | 102013018236 A1 * | 5/2014 | ............ | B60J 5/0404 |
| JP | H04-300715 A | 10/1992 | | |
| JP | 2021-003962 A | 1/2021 | | |
| JP | 2021-45995 A | 3/2021 | | |
| WO | 2006/059048 A1 | 6/2006 | | |

OTHER PUBLICATIONS

Extended European search report dated Nov. 28, 2022, in corresponding European patent Application No. 22183931.9, 8 pages.

* cited by examiner

*Primary Examiner* — Joseph D. Pape
(74) *Attorney, Agent, or Firm* — XSENSUS LLP

(57) ABSTRACT

The vehicle door structure includes: a door outer panel including a projected section that projects outward in a vehicle width direction, a recessed section that is separated from the projected section and recessed inward in the vehicle width direction, and a boundary section between the projected section and the recessed section; and a panel reinforcement fixed to an inner surface in the vehicle width direction of the door outer panel. The panel reinforcement (Continued)

includes: a first frame section that extends in a vehicle front-rear direction; and a second frame section at a position that overlaps the boundary section in the vehicle side view and is configured to be able to transmit a load to the first frame section at the time when the load in an inward direction of the vehicle width direction is applied to the boundary section.

14 Claims, 9 Drawing Sheets

VEHICLE DOOR STRUCTURE

CROSS-REFERENCE TO RELATED APPLICATION

The present application claims priority to Japanese application number 2021-121513 filed in the Japanese Patent Office on Jul. 26, 2021, the entire contents of which being incorporated herein by reference.

TECHNICAL FIELD

The present disclosure relate to a vehicle door structure, in detail, a vehicle door structure that includes: a door outer panel including a projected section that is projected outward in a vehicle width direction, a recessed section that is separated from the projected section and formed to be recessed inward in the vehicle width direction, and a boundary section between the projected section and the recessed section; and a panel reinforcement that is fixed to an inner surface in the vehicle width direction of the door outer panel.

BACKGROUND ART

Conventionally, a structure of fixing a panel reinforcement to an inner surface in a vehicle width direction of a door outer panel for a purpose of suppressing local deformation of a flat surface section of the door outer panel as a door outer plate at the time of being touched by a user has been known (see Patent document 1).

Meanwhile, in the case where the door outer panel is provided with a projected section projected outward in the vehicle width direction and a recessed section formed to be recessed inward in the vehicle width direction adjacent to each other, a boundary section is produced between the projected section and the recessed section. However, adoption of such a structure has the following problems in relation to door design.

For example, when the user who waxes the door outer panel presses the door outer panel by applying a certain amount of a force thereto, the boundary section between the projected section and the recessed section becomes a region vulnerable to the local deformation in association with a recessed region that is easily deformed by an inward load in the vehicle width direction. As a result, it is difficult to simultaneously obtain sophisticated design and a sense of luxury.

PRIOR ART DOCUMENTS

Patent Documents

[Patent document 1] JP-A-2021-45995

SUMMARY

Problems to be Solved

In view of the above, the present invention has a purpose of providing a vehicle door structure capable of suppressing local deformation of a boundary section in a door outer panel.

Means for Solving the Problems

A vehicle door structure according to the present disclosure is a vehicle door structure that includes: a door outer panel including a projected section that is projected outward in a vehicle width direction, a recessed section that is separated from the projected section and formed to be recessed inward in the vehicle width direction, and a boundary section between the projected section and the recessed section; and a panel reinforcement that is fixed to an inner surface in the vehicle width direction of the door outer panel. The panel reinforcement includes: a first frame section that extends in a vehicle front-rear direction; and a second frame section that is provided at the position that overlaps with the boundary section in the vehicle side view and is configured to be able to transmit a load to the first frame section at the time when the load in an inward direction of the vehicle width direction is applied to the boundary section.

The above-described projected section means an apex (point) or a top region (surface) that is projected outermost in the vehicle width direction of the door outer panel, and the above-described recessed section means an apex (point) or a top region (surface) that is projected innermost in the vehicle width direction of the door outer panel.

In addition, the above-described load is not an impact load but means a load that is generated when a user presses the door outer panel with a certain amount of a force, for example, when the user waxes the door outer panel.

According to the present disclosure, since the recessed section is formed to be recessed inward in the vehicle width direction, the boundary section is likely to be deformed at the time of being applied with the load in the inward direction of the vehicle width direction. However, since the second frame section provided at the position that overlaps with the boundary section in the vehicle side view transmits the load to the first frame section, local deformation of the boundary section may be suppressed.

As an aspect of the present disclosure, the first frame section may include a ridgeline section that extends in a substantially linear shape.

According to the present disclosure, t the load, which has been transmitted from the second frame section to the first frame section, may be transmitted to a fixture section of the panel reinforcement via the highly rigid ridgeline section of the first frame section.

As an aspect of the present disclosure, the projected section and the recessed section of the door outer panel may extend in the vehicle front-rear direction, and the boundary section between the projected section and the recessed section may extend in the vehicle front-rear direction at the substantially same height as a position where a door outer handle is provided.

According to the present disclosure, since the position of the boundary section between the projected section and the recessed section is set at the substantially same height as the door outer handle, a region that is highly likely to be touched by the user's hand may be effectively reinforced.

As an aspect of the present disclosure, the second frame section may include: a front-rear frame section at a height position where the door outer handle is provided, the front-rear frame section extending in the vehicle front-rear direction in a manner capable of transmitting the load; and an up-down frame section that couples the first frame section and the front-rear frame section in an up-down direction.

According to the present disclosure, since the front-rear frame section exists at the height position where the door outer handle is provided, the load from the front-rear frame section at the position of the door outer handle may be efficiently transmitted to the first frame section via the up-down frame section.

As an aspect of the present disclosure, the second frame section may include a truss section that is configured in a truss shape by the front-rear frame section and the up-down frame section.

According to the present disclosure, since the truss section has a high load dispersion/transmission effect, load transmission efficiency may be improved.

As an aspect of the present disclosure, an adhesive that is arranged in a portion near an apex of the truss section of the second frame section and bonds the second frame section and the door outer panel may further be provided.

According to the present disclosure, the portion near the apex of the truss section is a portion where the load can efficiently be dispersed, and efficiently bond the second frame section to the door outer panel. In this way, the load transmission efficiency of the second frame section may be improved.

As an aspect of the present disclosure, the apex of the truss section may be provided on a vehicle front-rear imaginary line that connects a front end and a rear end of the door outer handle and extends to the front of a vehicle.

According to the present disclosure, since the apex of the truss section is provided on the imaginary line of the door outer handle, the load in the region that is highly likely to be touched by the user's hand may be reliably dispersed.

As an aspect of the present disclosure, each of the first frame section and the second frame section may be formed substantially in a U-shape in cross section.

According to the present disclosure, cross-sectional secondary moment of each of the first frame section and the second frame section may be improved by the above-described cross-sectional shape and, thus, bending rigidity of the panel reinforcement may be improved.

As an aspect of the present disclosure, a front end and a rear end of the first frame section may respectively be fixed near the ridgeline sections in a front side section and a rear side section of the door inner panel.

According to the present disclosure, since both of the front and rear ends of the first frame section are fixed near the highly rigid ridgeline sections of the door inner panel, the load on the first frame section may be reliably dispersed and transmitted to the door inner panel.

As an aspect of the present disclosure, at least one of the front end and the rear end of the first frame section may be fixed to a reinforcing member that is provided to the door inner panel.

According to the present disclosure, since at least one of the front end and the rear end of the first frame section is fixed to the highly rigid reinforcing member, the load on the first frame section may be reliably dispersed and transmitted to the door inner panel via the reinforcing member.

[Advantages]

The present disclosure has such an effect that can suppress the local deformation of the boundary section in the door outer panel.

DETAILED DESCRIPTION

A purpose of suppressing local deformation of a boundary section in a door outer panel is realized by a configuration of a vehicle door structure that includes: a door outer panel including a projected section that is projected outward in a vehicle width direction, a recessed section that is separated from the projected section and formed to be recessed inward in the vehicle width direction, and a boundary section between the projected section and the recessed section; and a panel reinforcement that is fixed to an inner surface in the vehicle width direction of the door outer panel, in which the panel reinforcement includes: a first frame section extending in a vehicle front-rear direction; and a second frame section provided at the position that overlaps with the boundary section in the vehicle side view and configured to be able to transmit a load to the first frame section at the time when the load in an inward direction of the vehicle width direction is applied to the boundary section.

Embodiment

A detailed description will hereinafter be made on an embodiment of the present disclosure with reference to the drawings.

Figure 1:
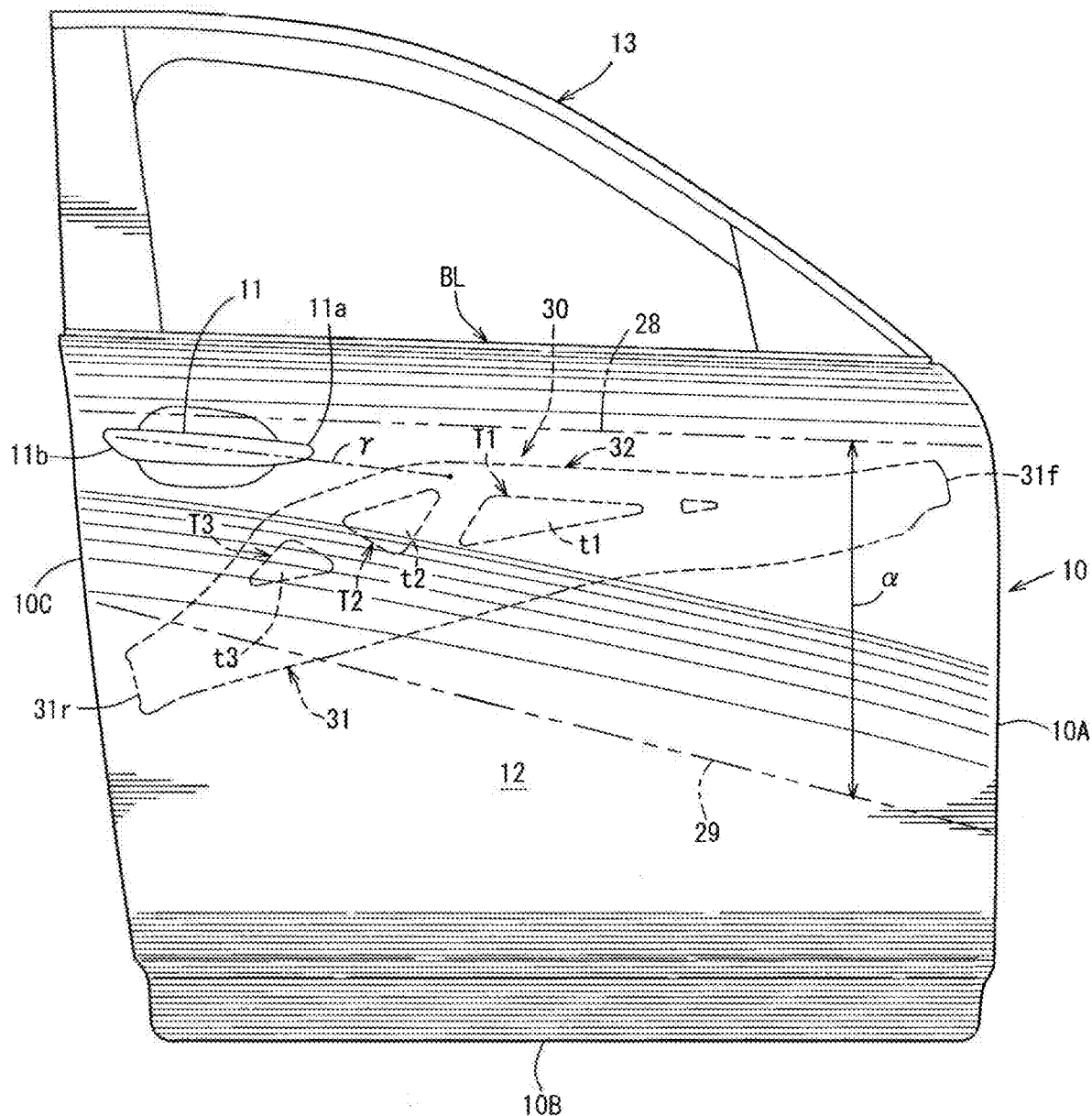
FIG. 1 is a side view in which a vehicle door structure is seen from an outer side and a right side of a vehicle.

The drawings illustrate a vehicle door structure. FIG. 1 is a side view in which the vehicle door structure is seen from an outer side and a right side of a vehicle, FIG. 2 is a side view illustrating the door structure in a state where a door outer panel is removed from FIG. 1, and FIG. 3 is an explanatory view illustrating a projected region including a projected section and a recessed region including a recessed section.

Figure 2:
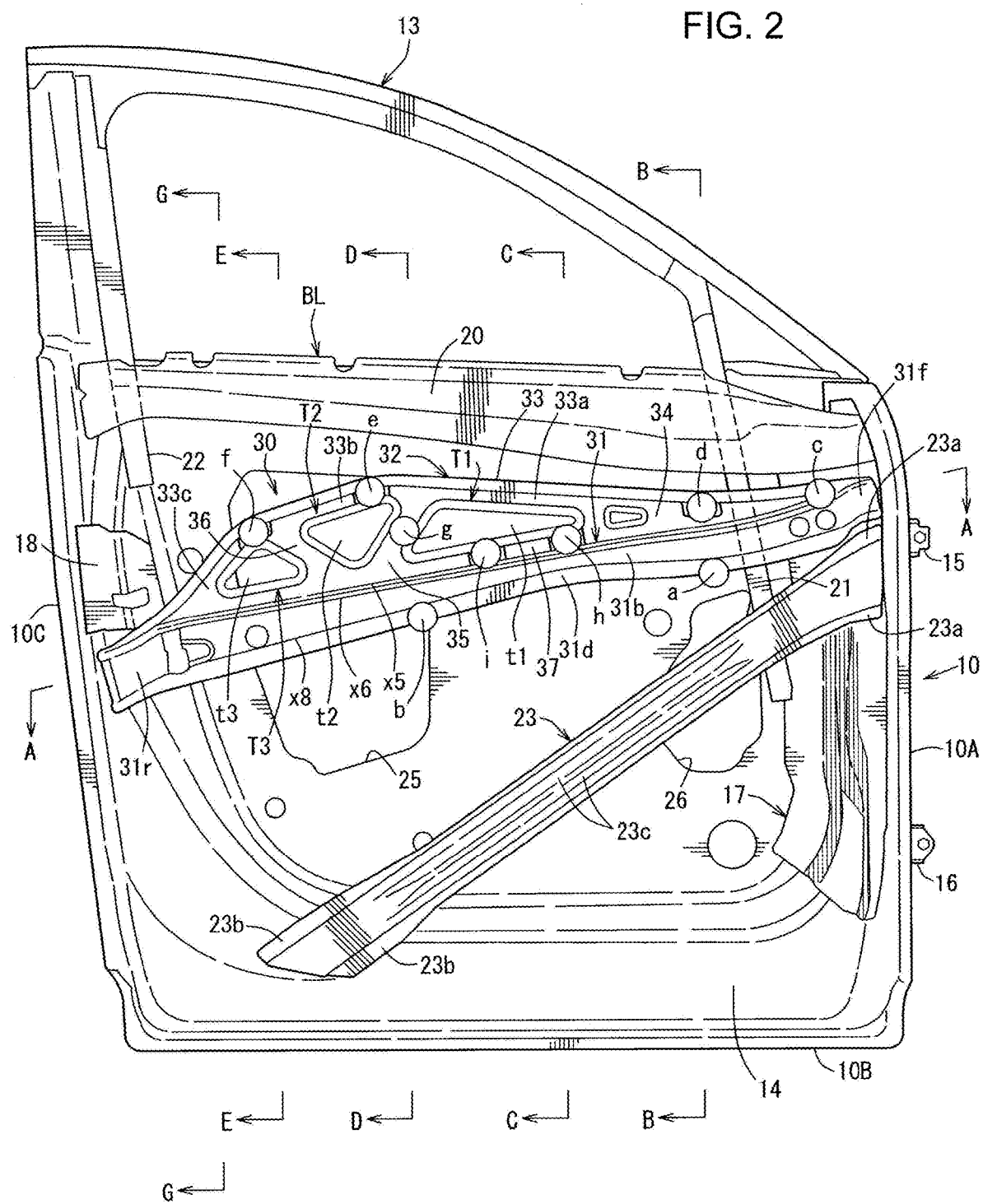
FIG. 2 is a side view illustrating a state where a door outer panel is removed.
Figure 3:
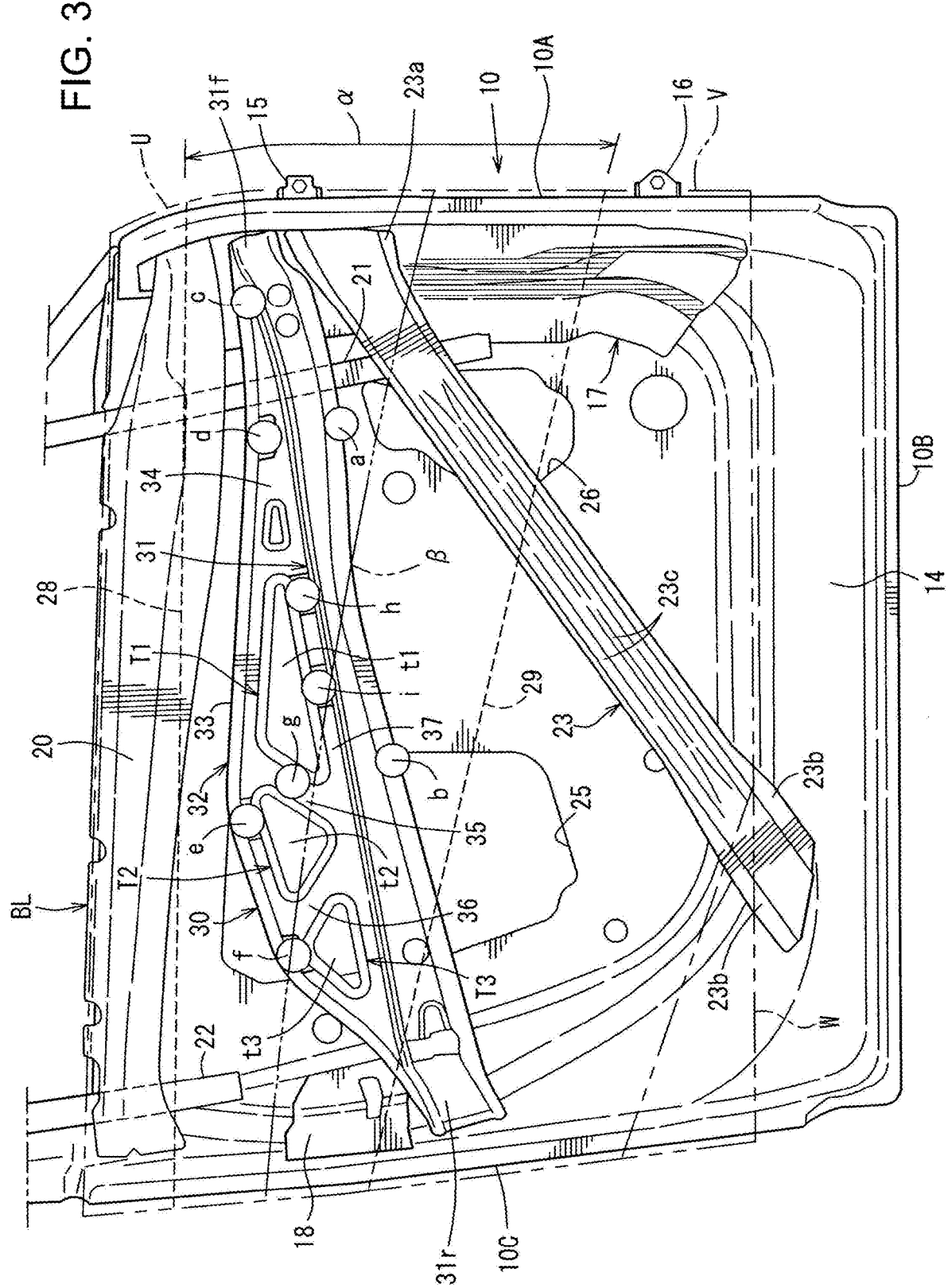
FIG. 3 is an explanatory view illustrating a projected region including a projected section and a recessed region including a recessed section.
Figure 4:
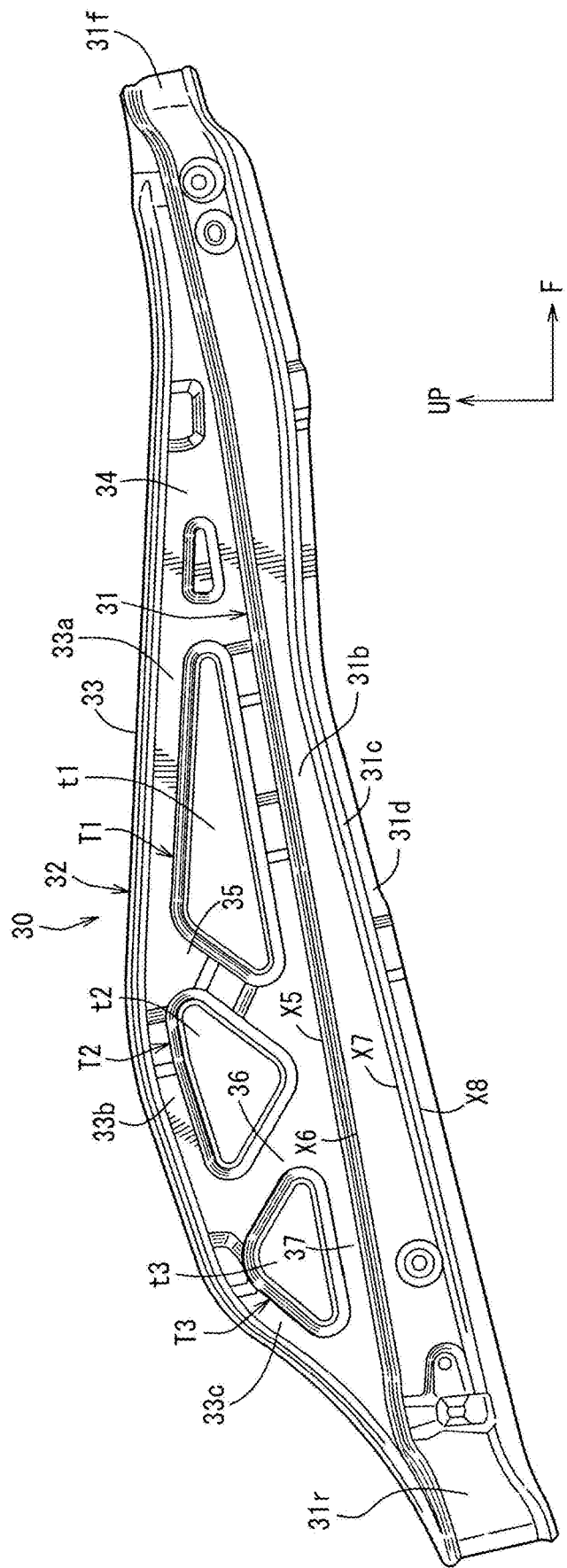
FIG. 4 is an enlarged view illustrating only a panel reinforcement as a single component.
Figure 5:
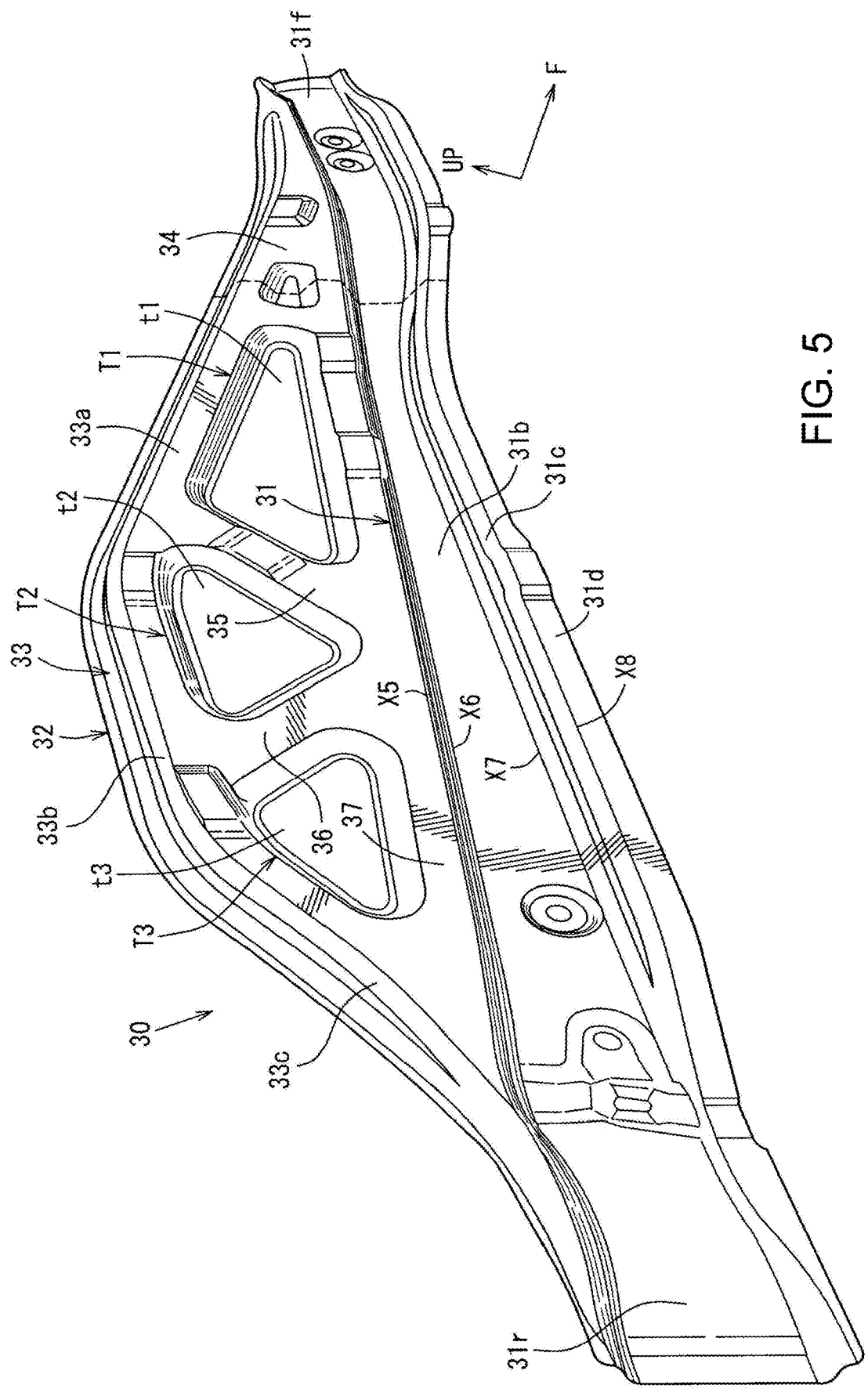
FIG. 5 is a perspective view illustrating only the panel reinforcement as the single component.
Figure 6:
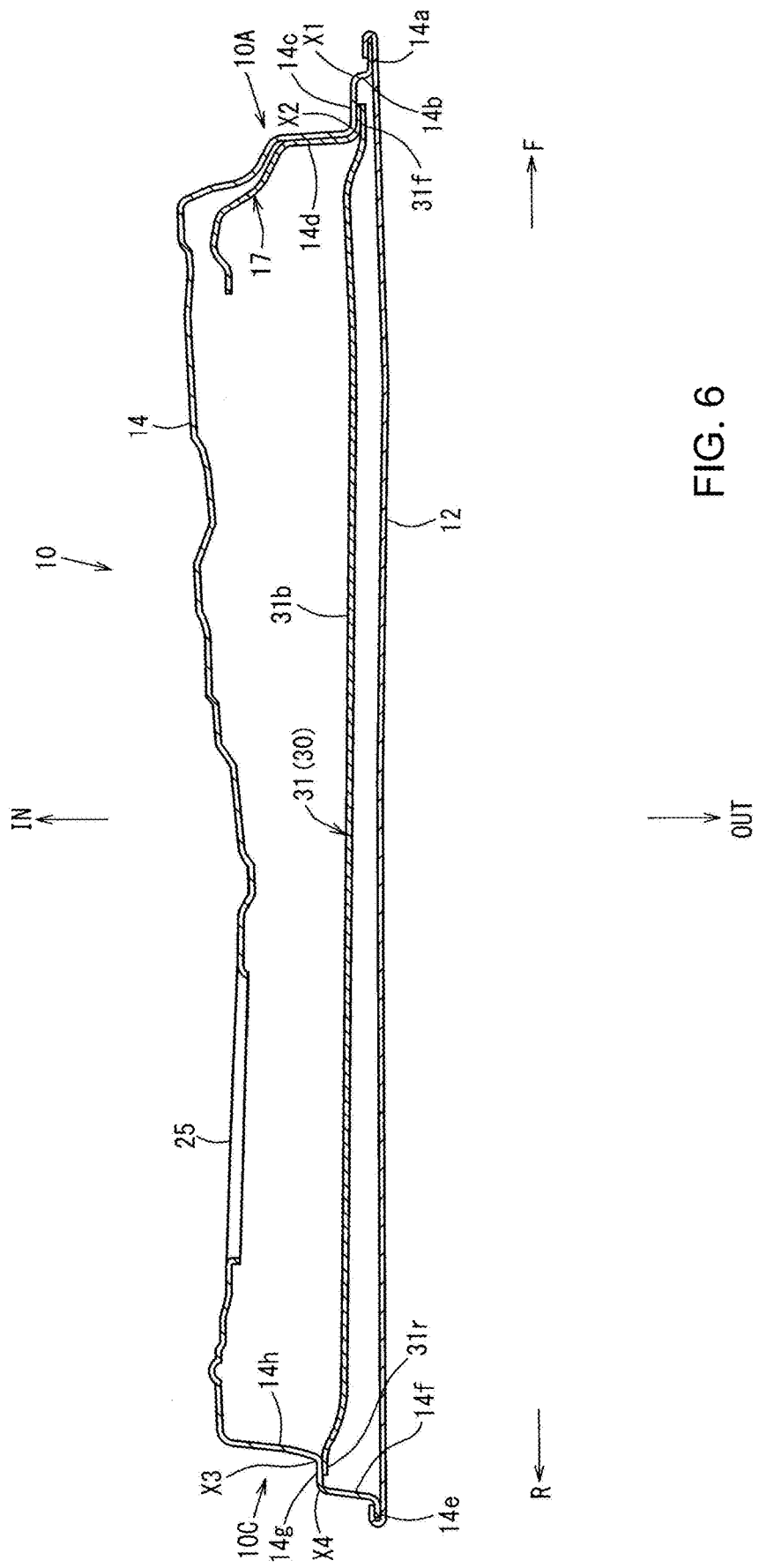
FIG. 6 is a cross-sectional view that is taken along arrow A-A in FIG. 2.
Figure 7A:
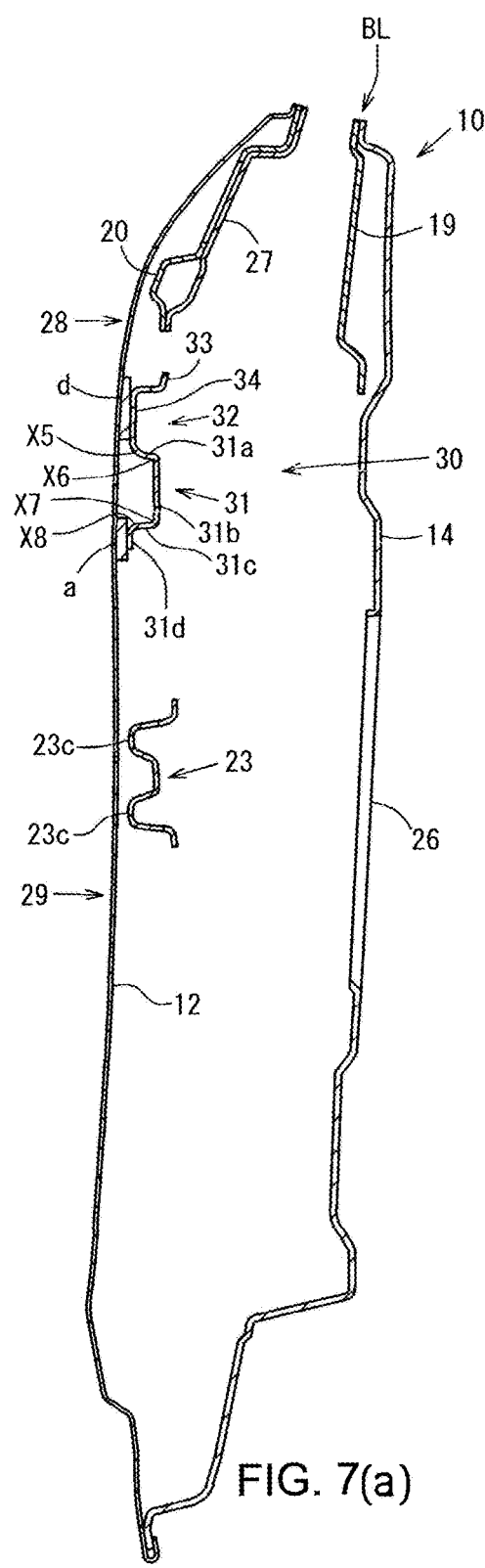
FIG. 7(a) is a cross-sectional view that is taken along arrow B-B in FIG. 2.
Figure 7B:
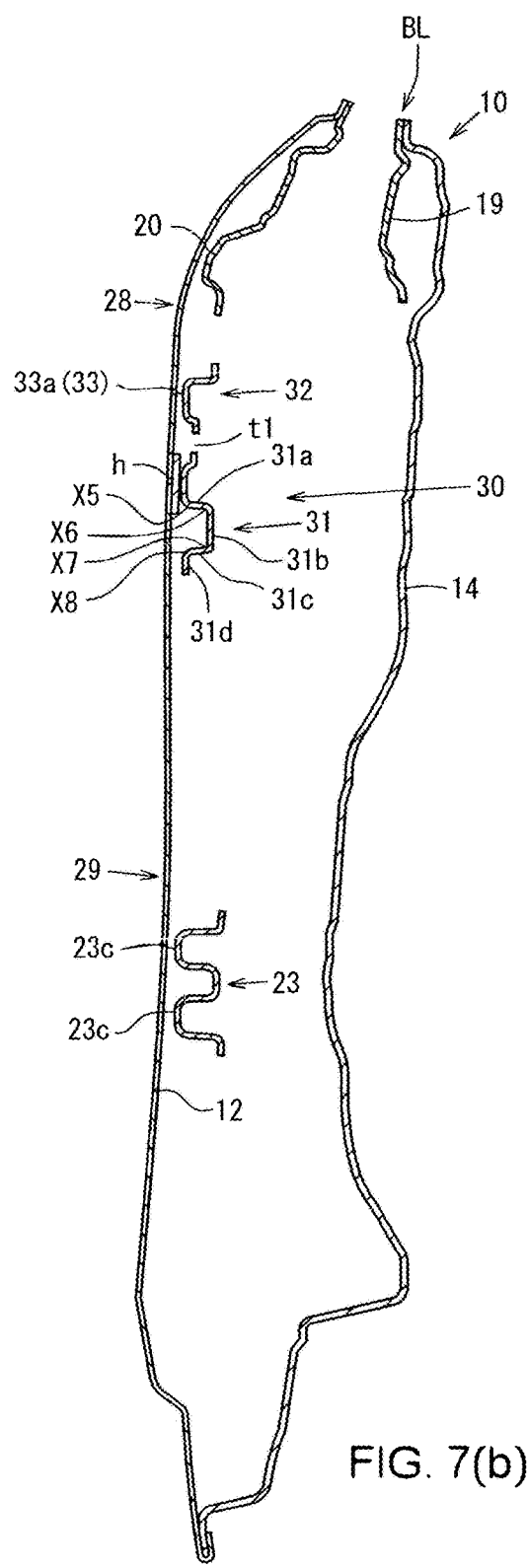
FIG. 7(b) is a cross-sectional view that is taken along arrow C-C in FIG. 2.
Figure 8A:
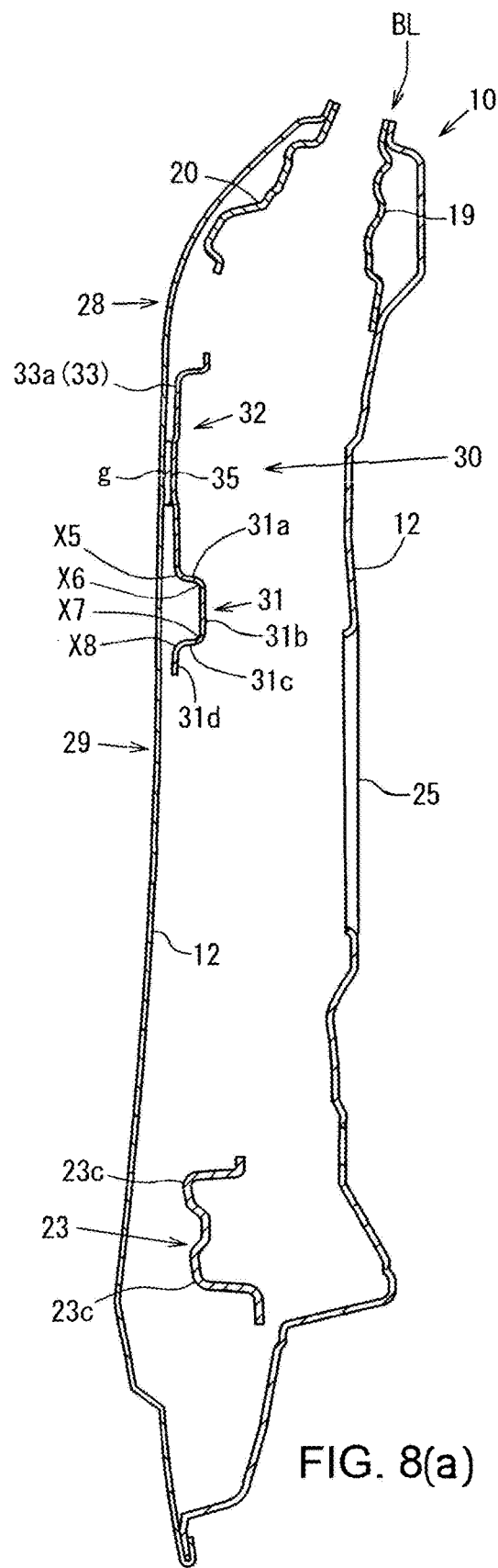
FIG. 8(a) is a cross-sectional view that is taken along arrow D-D in FIG. 2.
Figure 8B:
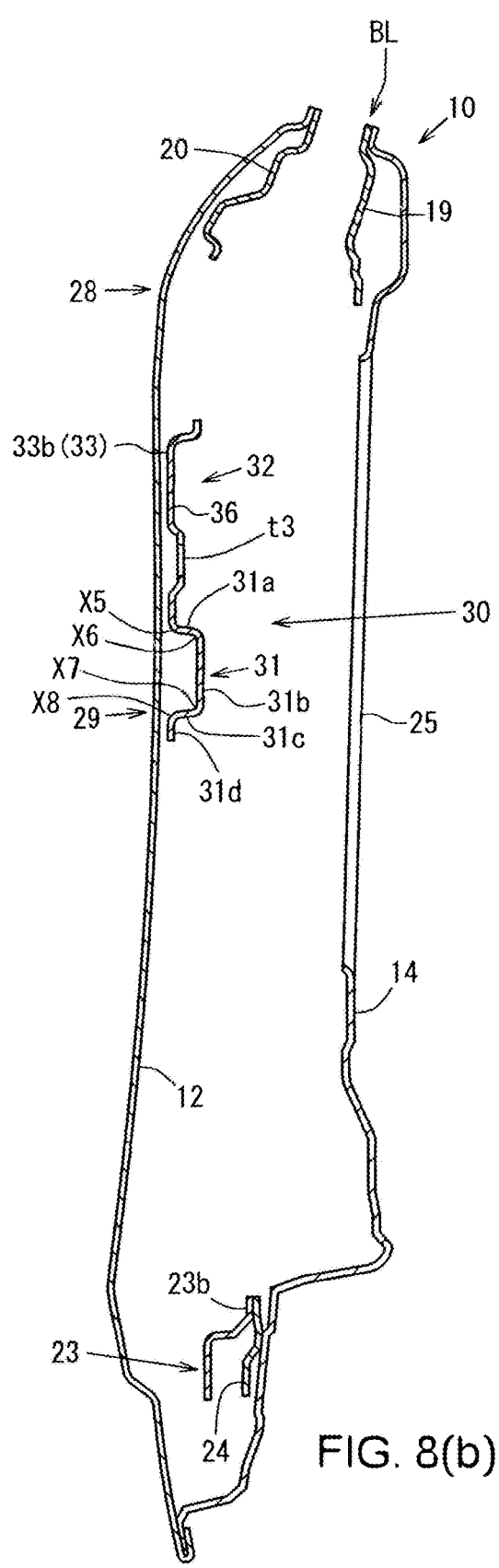
FIG. 8(b) is a cross-sectional view that is taken along arrow E-E in FIG. 2.
Figure 9:
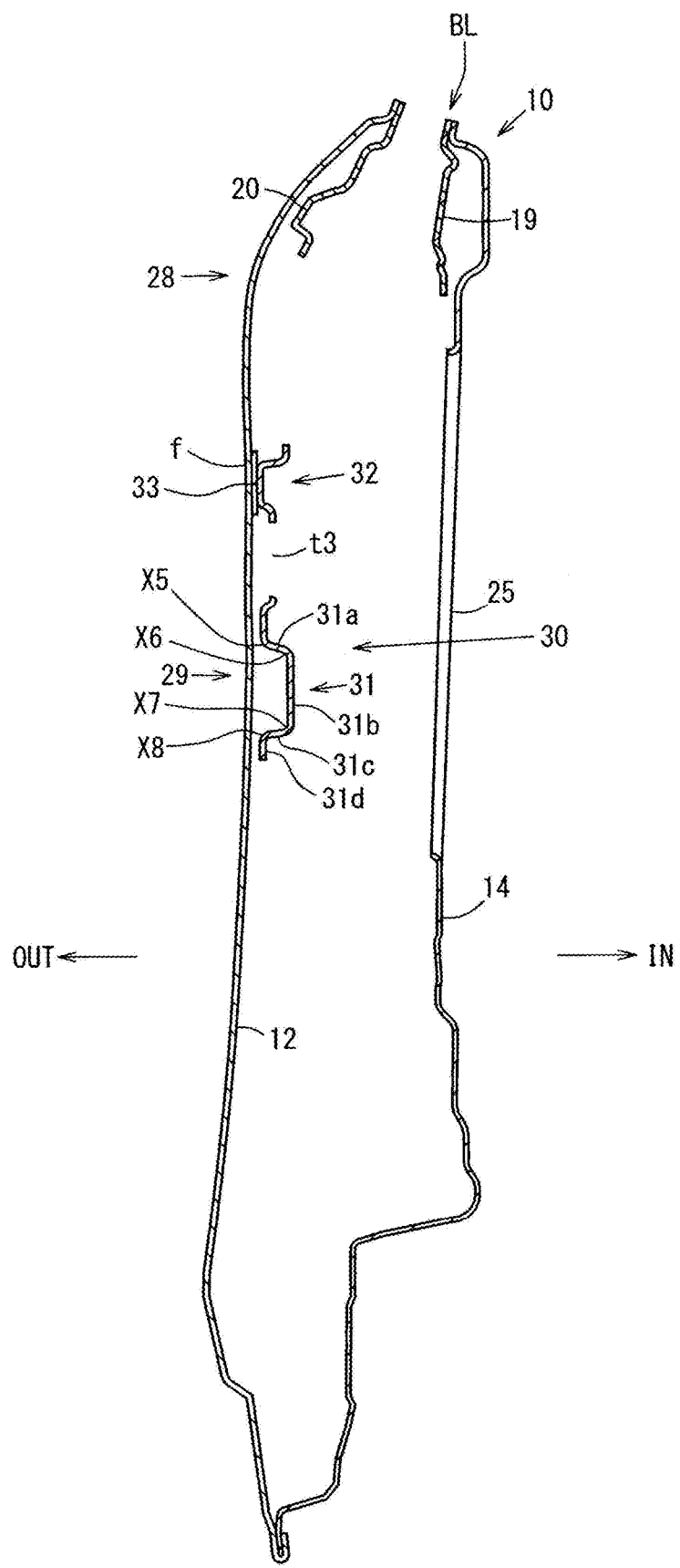
FIG. 9 is a cross-sectional view that is taken along arrow G-G in FIG. 2.

FIG. 4 is an enlarged view illustrating only a panel reinforcement as a single component, FIG. 5 is a perspective view illustrating only the panel reinforcement as the single component, FIG. 6 is a cross-sectional view that is taken along arrow A-A in FIG. 2, FIG. 7(a) is a cross-sectional view that is taken along arrow B-B in FIG. 2, FIG. 7(b) is a cross-sectional view that is taken along arrow C-C in FIG. 2, FIG. 8(a) is a cross-sectional view that is taken along arrow D-D in FIG. 2, FIG. 8(b) is a cross-sectional view that is taken along arrow E-E in FIG. 2, and FIG. 9 is a cross-sectional view that is taken along arrow G-G in FIG. 2.

As illustrated in FIG. 1, a door 10 (a front door) is provided as a side door that opens/closes a door opening as a doorway for a front-seat passenger.

As illustrated in FIG. 1, the above-described door 10 includes: a door outer handle 11; a door mirror (not illustrated) that abuts an outer surface in a vehicle width direction of a door outer panel 12 by using a door mirror through hole that is formed to be opened in a front portion near a belt line section BL of the door outer panel 12; door window glass; and a door sash section 13.

As illustrated in FIG. 2, the above-described door 10 is configured by integrally coupling a door inner panel 14 and the door outer panel 12 illustrated in FIG. 1 by hemming or the like. The door 10 includes a front side section 10A to which an upper and lower pair of door hinge brackets 15, 16 are attached, a lower side section 10B, and a rear side section 10C.

The above-described door 10 is openably/closably attached to a hinge pillar as a vehicle body via the upper and lower pair of the door hinge brackets 15, 16.

On a door internal space side of the door inner panel 14 in the above-described front side section 10A, a hinge reinforcement 17 that extends in an up-down direction is fixedly joined in a manner to correspond to the door hinge brackets 15, 16. On the door internal space side of the door inner panel 14 in the above-described rear side section 10C, a latch reinforcement 18 is fixedly joined.

In addition, an inner belt line reinforcement 19 (see FIGS. 7(a) and 7(b), FIGS. 8(a) and 8(b), and FIG. 9) and an outer belt line reinforcement 20 are provided to extend in a vehicle front-rear direction along the belt line section BL. These inner belt line reinforcement 19 and outer belt line reinforcement 20 reinforce an edge of a portion where the door window glass moves in/out.

As illustrated in FIGS. 7(a) and 7(b), FIGS. 8(a) and 8(b), and FIG. 9, the inner belt line reinforcement 19 is provided in an upper inner portion in the vehicle width direction of the door inner panel 14. As illustrated in FIG. 2, FIGS. 7(a) and 7(b), FIGS. 8(a) and 8(b), and FIG. 9, the outer belt line reinforcement 20 is provided in an upper inner portion in the vehicle width direction of the door outer panel 12.

The above-described door window glass is configured that lifting/lowering of a front side section and a rear side section thereof is respectively guided by front and rear guide rails 21, 22 provided in the door internal space of the door 10.

Furthermore, an impact bar 23 is slanted between an upper portion of the front side section 10A and a rear portion of the lower side section 10B in the above-described door 10.

This impact bar 23 is formed of a rigid member and may be integrally formed with flange sections 23a, 23b in a front end and a rear end thereof. The flange section 23a located in front is joined to an upper portion of the hinge reinforcement 17. The flange section 23b located at the rear is joined to an impact bar reinforcement 24 (see FIG. 8(b)). In this way, the impact bar 23 is arranged in a rearward inclined state such that the rear end thereof is located lower than the front end thereof.

Due to this rearward inclined arrangement structure, the impact bar 23 is configured to receive a lateral collision load in a relatively wide area.

In addition, the above-described impact bar 23 may be integrally formed with plural threads (two threads in this embodiment) of beads 23c, 23c, each of which extends in the vehicle front-rear direction.

Openings 25, 26 are formed to be opened in a main body section of the above-described door inner panel 14. These openings 25, 26 are used to dispose a door module or to dispose a speaker.

As illustrated in FIG. 7(a), at a position where the door mirror is attached, a mirror bracket 27 is provided on the inner side in the vehicle width direction of the outer belt line reinforcement 20 in a manner corresponding to a mirror base of the door mirror.

As illustrated in FIG. 1 and FIG. 3, the above-described door outer panel 12 includes: a projected section 28 that is projected outward in the vehicle width direction; a recessed section 29 that is separated downward from this projected section 28 and formed to be recessed inward in the vehicle width direction; and a boundary section α between the above-described projected section 28 and the above-described recessed section 29 (here, the boundary section means a zone or an area).

In this embodiment, in an upper portion of the door outer panel 32, the above-described projected section 28 is formed to be substantially parallel to the belt line section BL. The projected section 28 is continuously formed in the vehicle front-rear direction for an entire length in the vehicle front-rear direction of the door outer panel 12.

In an intermediate portion in the up-down direction of the door outer panel 12, the above-described recessed section 29 is formed to be inclined such that a portion on the front side section 10A side is located lower while a rear portion thereof is located higher. The recessed section 29 is continuously slanted in the vehicle front-rear direction for the entire length in the vehicle front-rear direction of the door outer panel 12.

Furthermore, the boundary section α that is located between the above-described projected section 28 and the above-described recessed section 29 is formed to have a longer vertical dimension on the front side section 10A side and a shorter vertical dimension on the rear side section 10C side.

The above-described projected section 28 is an apex line that is projected outermost in the vehicle width direction of a projected region U surrounded by imaginary lines in FIG. 3. Meanwhile, the above-described recessed section 29 is an apex line that is recessed innermost in the vehicle width direction of a recessed region V surrounded by imaginary lines in FIG. 3. In this embodiment, the recessed region V is located below the projected region U. A projected region W that has a right triangle shape and is smaller than each of the regions U, V is located in a lower rear portion of the recessed region V.

Here, a region upper end of the projected region U matches the belt line section BL. The projected region U is a region that is formed to include the inner belt line reinforcement 19, the outer belt line reinforcement 20, the mirror bracket 27, the upper door hinge bracket 15, an upper portion of the hinge reinforcement 17, and parts of upper portions of the openings 25, 26 and oppose each of these elements 19, 20, 27, 15, 25, 26.

The recessed region V is a region that is formed to include the latch reinforcement 18, the lower door hinge bracket 16, a lower portion of the hinge reinforcement 17, and lower-half portions of the openings 25, 26 and oppose each of these elements 18, 16, 17, 25, 26.

Furthermore, a boundary line β is formed between the above-described upper projected region U and the above-described lower recessed region V. As illustrated in FIG. 3, the boundary line β is formed to be inclined such that a vertical position thereof on the front side section 10A side is lower and the vertical position thereof on the rear side section 10C side is higher.

As illustrated in FIG. 1 and FIG. 2, a panel reinforcement 30 is provided. The panel reinforcement 30 is fixed to an inner surface in the vehicle width direction of the door outer panel 12 and extends in the vehicle front-rear direction.

In summary, the vehicle door structure in the embodiment includes: the door outer panel 12 including the projected section 28 that is projected outward in the vehicle width direction, the recessed section 29 that is separated from the projected section 28 and formed to be recessed inward in the vehicle width direction, and the boundary section α between the projected section 28 and the recessed section 29; and the panel reinforcement 30 that is fixed to the inner surface in the vehicle width direction of the door outer panel 12.

The above-described panel reinforcement 30 is bonded to the inner surface in the vehicle width direction of the door outer panel 12 by using adhesives a to i, which will be described below, and is also joined to front and rear step sections 14c, 14g of the door inner panel 14 as illustrated in FIG. 6.

In other words, on the front side section 10A side of the door 10, the door inner panel 14 includes a flange section 14a that is fixedly sandwiched by a hemmed portion of the door outer panel 12. An extending section 14b is provided to extend inward in the vehicle width direction from a rear end of this flange section 14a. In addition; the step section 14c is provided to extend to the rear of the vehicle from the extending section 14b. Furthermore, a front side section 14d is provided to extend inward in the vehicle width direction from a rear end of the step section 14c.

Ridgeline sections X1, X2, each of which extends in the up-down direction, are respectively formed in front and rear portions of the above-described step section 14c.

On the rear side section 10C side of the door 10, the door inner panel 14 includes a flange section 14e that is fixedly sandwiched by a hemmed portion of the door outer panel 12. An extending section 14f is provided to extend inward in the vehicle width direction from a front end of this flange section 14e. In addition, the step section 14g is provided to extend to the front of the vehicle from the extending section 14f. A rear side section 14h is further provided to extend inward in the vehicle width direction from a front end of the step section 14g.

Ridgeline sections X3, X4, each of which extends in the up-down direction, are respectively formed in front and rear portions of the above-described step section 14g.

As illustrated in FIG. 2 and FIG. 6, a front end of the panel reinforcement 30 (see a front end 31f of a first frame section 31, which will be described below) is fixed to the step section 14c of the door inner panel 14 in the front side section 10A immediately above the upper door hinge bracket 15. As illustrated in FIG. 2 and FIG. 6, a rear end of the panel reinforcement 30 (see a rear end 31r of the first frame section 31, which will, be described below) is fixed to the step section 14g of the door inner panel 14 in the rear side section 10C immediately below the latch reinforcement 18.

The ridgeline sections X1, X2, X3, X4, each of which extends in the up-down direction, are respectively formed in the front and rear portions of the above-described front and rear step sections 14c, 14g, and the front end and the rear end of the panel reinforcement 30 are fixed to portions of the door inner panel 14 near the ridgeline sections X1, X2, X3, X4 in the front side section 10A and the rear side section 10C.

Here, three pieces of the front end of the panel reinforcement 30, the step section 14c of the door inner panel 14, and the hinge reinforcement 17 are welded together.

A plate thickness of the above-described panel reinforcement 30 is 0.5 mm$^t$, a plate thickness of the door outer panel 12 is 0.65 mm$^t$, and a plate thickness of the hinge reinforcement 17 is 1.6 mm$^t$. Each of the plate thicknesses is not limited to the numerical value described above. However, by adopting the three-piece welding structure in which the panel reinforcement 30 in the relatively small plate thickness is welded to the hinge reinforcement 17 and the door inner panel 14 in the relatively large plate thicknesses, sufficient load transmission and a sufficient load dispersion effect are obtained.

As illustrated in FIG. 2 to FIG. 5, the above-described panel reinforcement 30 includes: the first frame section 31 that extends in the vehicle front-rear direction; and a second frame section 32 that is provided at the position that overlaps with the boundary section α in the vehicle side view and is configured to be able to transmit the load to the first frame section 31 at the time when the load in an inward direction of the vehicle width direction is applied to the boundary section α.

As illustrated in FIG. 2 to FIG. 5, in this embodiment, the first frame section 31 is located below the second frame section 32.

The following effect can be obtained by providing the second frame section 32 that transmits the input load in the inward direction of the vehicle width direction to the first frame section 31.

In other words, since the recessed section 29 is formed to be recessed inward in the vehicle width direction, the boundary section a is likely to be deformed at the time of being applied with the load in the inward direction of the vehicle width direction. However, since the second frame section 32 provided at the position that overlaps with the boundary section α in the vehicle side view transmits the load to the first frame section 31, local deformation of the boundary section α may be suppressed.

As illustrated in FIG. 7(a) to FIG. 9, the above-described first frame section 31 is formed substantially in a U-shape in vertical cross section by having an upper wall 31a, an inner wall 31b that extends downward from an inner end in the vehicle width direction of the upper wall 31a, a lower wall 31c that extends outward in the vehicle width direction from a lower end of the inner wall 31b, and a lower flange 31d that extends downward from an outer end in the vehicle width direction of the lower wall 31c.

In this way, ridgeline sections X5, X6, X7, X8, each of which continuously extends in a substantially linear shape in the vehicle front-rear direction, are respectively formed in inner and outer portions of the upper wall 31a and the lower wall 31c (see FIG. 4 and FIG. 5).

In other words, the first frame section 31 includes the four ridgeline sections X5 to X8, each of which extends in the substantially linear shape. In this way, it is configured to transmit the load, which has been transmitted from the second frame section 32 to the first frame section 31, to the step sections 14c, 14g of the door inner panel 14 as front and rear fixture sections of the panel reinforcement 30, in detail, the highly rigid hinge reinforcement 17 on the front side via the plural highly rigid ridgeline sections X5 to X8 of the first frame section 31, in particular, the two ridgeline sections X5, X6 located on an upper side.

As illustrated in FIG. 1, the projected section 28 and the recessed section 29 of the door outer panel 12 extend in the vehicle front-rear direction, and the boundary section α between the projected section 28 and the recessed section 29 extends in the vehicle front-rear direction at the substantially same height as a position where the door outer handle 11 is provided. As described above, the second frame section 32 of the panel reinforcement 30 is provided at the position that overlaps with in the boundary section α in the vehicle side view.

As described, the position of the boundary section α between the projected section 28 and the recessed section 29 is set at the substantially same height as the door outer handle 11. In this way, it is configured to effectively reinforce a region, which is highly likely to be touched by the user's hand, by the second frame section 32 of the panel reinforcement 30.

As illustrated in FIG. 1, FIG. 4, and FIG. 5, the above-described second frame section 32 includes: a front-rear frame section 33 at the height position where the door outer handle 11 is provided, the front-rear frame section 33 extending in the vehicle front-rear direction in a manner capable of transmitting the load; and plural first to third up-down frame sections 34, 35, 36 that couple the first frame section 31 and the front-rear frame section 33 in the up-down direction.

As illustrated in FIG. 2 and FIG. 4, the above-described front-rear frame section 33 includes: a front section 33a that extends substantially horizontally in the front-rear direction from the front end of the panel reinforcement 30 to an upper end of the second up-down frame section 35; an intermediate section 33b that is inclined downward to the rear at an angle of approximately 20 degrees from a rear end of the front section 33a to an upper end of the third up-down frame section 36; and a rear section 33c that is inclined downward to the rear at an angle of approximately 30 degrees from a rear end of the intermediate section 33b to the rear end of the panel reinforcement 30.

As described above, the front-rear frame section 33 exists at the height position where the door outer handle 11 is provided. In this way, it is configured to further efficiently transmit the load to the first frame section 31 from the front-rear frame section 33 at the position of the door outer handle 11 via the first to third up-down frame sections 34, 35, 36.

As illustrated in FIG. 4 and FIG. 5, the above-described second frame section 32 includes plural first to third truss sections T1, T2, T3, each of which is configured in a truss shape by the front-rear frame section 33 and the up-down frame sections 34, 35, 36.

In this embodiment, the three truss sections T1, T2, T3 are formed. However, the number of the truss sections to be formed is not limited thereto.

Here, the above-described second frame section 32 includes a bottom side frame section 37 that forms bottom side sections of the truss sections T1, T3 and integrally couples the first up-down frame section 34 and the rear section 33c of the front-rear frame section 33 in the vehicle front-rear direction.

The first truss section T1 is surrounded by the elements 33a, 35, 37, and a triangular opening t1 is formed by these elements 33a, 35, 37.

The second truss section T2 is surrounded by the elements 33b, 35, 36, and a triangular opening t2 is formed by these elements 33b, 35, 36.

The third truss section T3 is surrounded by the elements 33c, 36, 37, and a triangular opening t3 is formed by these elements 33c, 36, 37.

As described, the above-described second frame section 32 includes the truss sections T1, T2, T3, each of which is configured in the truss shape. The truss sections T1, T2, T3 are configured to have a high load dispersion/transmission effect and improve load transmission efficiency from the second frame section 32 to the first frame section 31.

As indicated by white circles for convenience of illustration in FIG. 2 and FIG. 3, the panel reinforcement 30 and the door outer panel 12 may be bonded with the adhesives a to i. These adhesives a to i may be provided at spaced intervals in the vehicle front-rear direction and the up-down direction.

The adhesives a, b bond the lower flange 31d of the first frame section 31 to the door outer panel 12. The adhesives c, d, e, f bond the front-rear frame section 33 of the second frame section 32 to the door outer panel 12. The adhesive g bonds the second up-down frame section 35 to the door outer panel 12. Furthermore, the adhesives h, i bond the bottom side frame section 37 at a position corresponding to the bottom side of the first truss section T1 to the door outer panel 12.

As illustrated in FIG. 2, FIG. 3, and FIG. 9, of the adhesives a to i, the adhesive f is arranged at an apex of the third truss section T3 in the second frame section 32 (the apex is a point where two adjacent sides of a polygon intersect), and bonds the second frame section 32 and the door outer panel 12.

In addition, as illustrated in FIG. 2 and FIG. 3, of the adhesives a to i, the adhesives e, g are arranged in a portion near an apex of the second truss section T2 in the second frame section 32 and bond the second frame section 32 and the door outer panel 12.

As described, the adhesives f, e, g are provided to be arranged near the apex of the third truss section T3 and the portion near the apex of the second truss section T2 in the second frame section 32, and bond the second frame section 32 and the door outer panel 12.

Each of the apex and the portion near the apex of the truss sections T2, T3 is a portion where the load can efficiently be dispersed, and efficiently bond the second frame section 32 to the door outer panel 12. In this way, the load transmission efficiency of the second frame section 32 may be improved.

As illustrated in FIG. 1 and FIG. 2, of the plural truss sections T1, T2, T3, the apex of the second truss section T2 is provided on a vehicle front-rear imaginary line γ that connects a front end 11a and a rear end 11b of the door outer handle 11 and extends to the front of the vehicle.

As described, the apex of the second truss section T2 is provided on the imaginary line γ of the door outer handle 11. In this way, it is configured to reliably disperse the load in the region that is highly likely to be touched by the user's hand.

As illustrated in cross-sectional views in FIGS. 7(a) and 7(b), FIGS. 8(a) and 8(b), each of the first frame section 31 and the second frame section 32 is formed substantially in the U-shape in cross section. In detail, the first frame section 31 is formed substantially in the U-shape in cross section in which an open side faces outward in the vehicle width direction, and the second frame section 32 is formed substantially in the U-shape in cross section in which an open side faces inward in the vehicle width direction.

Further in detail, a vertical cross section of the first frame section 31 is formed substantially in the U-shape. In the second frame section 32, a cross section in a direction that intersects an extending direction of the front-rear frame section 33 and the up-down frame sections 34, 35, 36 constituting the second frame section 32 is formed substantially in the U-shape.

Due to the above-described substantially U-shaped cross-sectional shapes, it is configured to improve cross-sectional secondary moment of each of the first frame section 31 and the second frame section 32 (generally expressed as $Ix = \int y^2 dA$, which represents resistance to a bending force) and thereby improve bending rigidity of the panel reinforcement 30.

As illustrated in FIG. 6, the front end 31f and the rear end 31r of the above-described first frame section 31 are fixed near the ridgeline sections X1 to X4 in the step sections 14c, 14g of the front side section 10A and the rear side section 10C of the door inner panel 14.

As described, both of the front and rear ends of the first frame section 31 are fixed near the highly rigid ridgeline sections X1 to X4 of the door inner panel 14. In this way, it is configured to reliably disperse and transmit the load on the first frame section 31 to the door inner panel 14.

Furthermore, as illustrated in FIG. 6, at least one of the front end 31*f* and the rear end 31*r* of the first frame section 31 is fixed to a reinforcing member that is provided to the door inner panel 14.

In this embodiment, as illustrated in FIG. 6, the front end 31*f* of the first frame section 31 is fixed to the hinge reinforcement 17 as the reinforcing member provided to the door inner panel 14.

Further in detail, three pieces of the front end 31*f*, the hinge reinforcement 17, and the step section 14*c* of the door inner panel 14 are welded by spot welding means. As described, the front end 31*f* of the first frame section 31 is fixed to the highly rigid hinge reinforcement 17. In this way, it is configured to reliably disperse and transmit the load on the first frame section 31 to the door inner panel 14 via the hinge reinforcement 17.

Here, such a structure may be adopted that the latch reinforcement 18 illustrated in FIG. 2 and FIG. 3 extends downward to a lower end position of the rear end 31*r* of the first frame section 31 and the rear end 31*r* of the first frame section 31 is also fixed to the latch reinforcement 18 as a reinforcing member provided to the door inner panel 14.

In the drawings, an arrow F indicates the vehicle front direction, an arrow R indicates the vehicle rear direction, an arrow IN indicates inward in the vehicle width direction, an arrow OUT indicates outward in the vehicle width direction, and an arrow UP indicates the vehicle up direction.

As it has been described so far in detail, the vehicle door structure in the embodiment includes: the door outer panel 12 including the projected section 28 that is projected outward in the vehicle width direction, the recessed section 29 that is separated from the projected section 28 and formed to be recessed inward in the vehicle width direction, and the boundary section α between the projected section 28 and the recessed section 29; and the panel reinforcement 30 that is fixed to the inner surface in the vehicle width direction of the door outer panel 12. The panel reinforcement 30 includes: the first frame section 31 that extends in the vehicle front-rear direction; and the second frame section 32 that is provided at the position that overlaps with the boundary section α in the vehicle side view and is configured to be able to transmit the load to the first frame section 31 at the time when the load in the inward direction of the vehicle width direction is applied to the boundary section α (see FIG. 1, FIG. 2, and FIG. 3).

According to such a vehicle door structure, since the recessed section 29 is formed to be recessed inward in the vehicle width direction, the boundary section α is likely to be deformed at the time of being applied with the load in the inward direction of the vehicle width direction. However, since the second frame section 32 provided at the position that overlaps with the boundary section a in the vehicle side view transmits the load to the first frame section 31, the local deformation (elastic deformation) of the boundary section α may be suppressed.

In such a vehicle door structure, the first frame section 31 includes the ridgeline sections X5 to X8, each of which extends substantially linearly (see FIG. 4 and FIG. 5).

According to such a vehicle door structure, the load, which has been transmitted from the second frame section 32 to the first frame section 31, may be transmitted to the fixture sections of the panel reinforcement 30 via the highly rigid ridgeline sections X5 to X8 of the first frame section 31.

In such a vehicle door structure, the projected section 28 and the recessed section 29 of the door outer panel 12 extend in the vehicle front-rear direction, and the boundary section α between the projected section 28 and the recessed section 29 extends in the vehicle front-rear direction at the substantially same height as the position where the door outer handle 11 is provided (see FIG. 1).

According to such a vehicle door structure, since the position of the boundary section α between the projected section 28 and the recessed section 29 is set at the substantially same height as the door outer handle 11, the region that is highly likely to be touched by the user's hand may be further effectively reinforced.

In such a vehicle door structure, the second frame section 32 includes: the front-rear frame section 33 at the height position where the door outer handle 11 is provided, the front-rear frame section 33 extending in the vehicle front-rear direction in the manner capable of transmitting the load; and the up-down frame sections 34, 35, 36 that couple the first frame section 31 and the front-rear frame section 33 in the up-down direction (see FIG. 4 and FIG. 5).

According to such a vehicle door structure, since the front-rear frame section 33 exists at the height position where the door outer handle 11 is provided, the load from the front-rear frame section 33 at the position of the door outer handle 11 via the up-down frame sections 34, 35, 36 to the first frame section 31 may be further efficiently transmitted.

In such a vehicle door structure, the second frame section 32 includes the truss sections T1, T2, T3, each of which is configured in the truss shape by the front-rear frame section 33 and the up-down frame sections 34, 35, 36 (see FIG. 4 and FIG. 5).

According to such a vehicle door structure, since the truss sections T1, T2, T3 have the high load dispersion/transmission effect, the load transmission efficiency may be improved.

Such a vehicle door structure includes the adhesives e, g, f that are arranged near the apexes of the truss sections T2, T3 of the second frame section 32 and bond the second frame section 32 and the door outer panel 12 (see FIG. 2 and FIG. 3).

According to such a vehicle door structure, each of the portions near the apexes of the truss sections T2, T3 is the portion where the load can efficiently be dispersed, and efficiently bonds the second frame section 32 to the door outer panel 12. In this way, the load transmission efficiency of the second frame section 32 may be improved.

In such a vehicle door structure, the apex of the truss section T2 is provided on the vehicle front-rear imaginary line γ that connects the front end 11*a* and the rear end 11*b* of the door outer handle 11 and extends to the front of the vehicle (see FIG. 1 and FIG. 2).

According to such a vehicle door structure, since the apex of the truss section T2 is provided on the imaginary line γ of the door outer handle 11, the load in the region that is highly likely to be touched by the user's hand may be reliably disperse.

In such a vehicle door structure, each of the first frame section 31 and the second frame section 32 is formed substantially in the U-shape in cross section (see FIG. 7(*a*) to FIG. 9).

According to such a vehicle door structure, the cross-sectional secondary moment of each of the first frame section 31 and the second frame section 32 may be improved by the above-described cross-sectional shape and, thus, the bending rigidity of the panel reinforcement 30 may be improved.

In such a vehicle door structure, the front end 31*f* and the rear end 31*r* of the first frame section 31 are fixed near the ridgeline sections X1 to X4 in the front side section 10A and the rear side section 10C of the door inner panel 14 (see FIG. 6).

According to such a vehicle door structure, since both of the front and rear ends of the first frame section 31 are fixed near the highly rigid ridgeline sections X1 to X4 of the door inner panel 14, the load on the first frame section 31 may be reliably dispersed and transmitted to the door inner panel 14.

In such a vehicle door structure, at least one of the front end 31*f* and the rear end 31*r* of the first frame section 31 is fixed to the reinforcing member (the hinge reinforcement 17) provided to the door inner panel 14 (see FIG. 6).

According to such a vehicle door structure, since at least one of the front end 31*f* and the rear end 31*r* of the first frame section 31 is fixed to the highly rigid reinforcing member (see the hinge reinforcement 17), the load on the first frame section 31 may be reliably dispersed and transmitted to the door inner panel 14 via the reinforcing member (the hinge reinforcement 17).

In correspondence between the configuration in the present disclosure and the above-described embodiment, the reinforcing member in the present disclosure corresponds to the hinge reinforcement 17 in the embodiment. However, embodiments are not limited only to the configuration in the above-described embodiment, and many embodiments can be implemented.

INDUSTRIAL APPLICABILITY

As it has been described so far, the present disclosure is useful for the vehicle door structure that includes: the door outer panel including the projected section that is projected outward in the vehicle width direction, the recessed section that is separated from the projected section and formed to be recessed inward in the vehicle width direction, and the boundary section between the projected section and the recessed section; and the panel reinforcement that is fixed to the inner surface in the vehicle width direction of the door outer panel.

DESCRIPTION OF REFERENCE SIGNS AND NUMERALS

10: Door
10A: Front side section
10C: Rear side section
11: Door outer handle
11*a*: Front end
11*b*: Rear end
12: Door outer panel
14: Door inner panel
17: Hinge reinforcement (reinforcing member)
28: Projected section
29: Recessed section
30: Panel reinforcement
31: First frame section
31*f*: Front end
31*r*: Rear end
32: Second frame section
33: Front-rear frame section
34 to 36: Up-down frame section α: Boundary section
γ: Vehicle front-rear imaginary line
T1 to T3: Truss section
X1 to X4: Ridgeline section
X5 to X8: Ridgeline section
e, f, g: Adhesive

The invention claimed is:

1. A vehicle door structure comprising:
a door outer panel including
a projected section that is projected outward in a vehicle width direction,
a recessed section that is separated from the projected section and recessed inward in the vehicle width direction, and
a boundary section between the projected section and the recessed section; and
a panel reinforcement fixed to an inner surface in the vehicle width direction of the door outer panel, wherein
the panel reinforcement includes:
a first frame section that extends in a vehicle front-rear direction; and
a second frame section at a position that overlaps the boundary section in a vehicle side view and is configured to be able to transmit a load to the first frame section at a time when the load in an inward direction of the vehicle width direction is applied to the boundary section;
the second frame section includes:
a front-rear frame section at a height position of a door outer handle is provided, the front-rear frame section extending in the vehicle front-rear direction in a manner capable of transmitting the load;
an up-down frame section that couples the first frame section and the front-rear frame section in an up-down direction; and
a truss section that is configured in a truss shape by the front-rear frame section and the up-down frame section, an apex of the truss section being at a position that overlaps with the boundary section in the vehicle side view and on a vehicle front-rear imaginary line that connects a front end and a rear end of the door outer handle and extends to a front of a vehicle.

2. The vehicle door structure according to claim 1, wherein the first frame section includes a ridgeline section that extends in a substantially linear shape.

3. The vehicle door structure according to claim 2, wherein
the projected section and the recessed section of the door outer panel extend in the vehicle front-rear direction, and the boundary section between the projected section and the recessed section extends in the vehicle front-rear direction at substantially a same height as a position of a door outer handle.

4. The vehicle door structure according to claim 2, further comprising:
an adhesive in a portion near the apex of the truss section of the second frame section that bonds the second frame section and the door outer panel.

5. The vehicle door structure according to claim 4, wherein each of the first frame section and the second frame section has a substantially U-shape in cross section.

6. The vehicle door structure according to claim 2, further comprising a door inner panel, wherein a front end and a rear end of the first frame section are respectively fixed near the ridgeline section in a front side section and a rear side section of the door inner panel.

7. The vehicle door structure according to claim 6, wherein at least one of the front end and the rear end of the first frame section is fixed to a reinforcing member that is provided to the door inner panel.

8. The vehicle door structure according to claim 1, wherein
the projected section and the recessed section of the door outer panel extend in the vehicle front-rear direction, and the boundary section between the projected section and the recessed section extends in the vehicle front-rear direction at substantially a same height as a position of a door outer handle.

9. The vehicle door structure according to claim 1, further comprising a door inner panel, wherein a front end and a rear end of the first frame section are respectively fixed near ridgeline sections in a front side section and a rear side section of the door inner panel.

10. The vehicle door structure according to claim 1, further comprising a door inner panel, wherein at least one of a front end and a rear end of the first frame section is fixed to a reinforcing member that is provided to the door inner panel.

11. The vehicle door structure according to claim 1, wherein the front-rear frame section includes:
a front section that extends substantially horizontally in the vehicle front-rear direction of the door outer panel from the front end of the panel reinforcement to an upper end of an up-down frame section;
an intermediate section that is inclined downward to the rear at a first angle from a rear end of the front section to an upper end of a further up-down frame section; and
a rear section that is inclined downward to the rear at a second angle from a rear end of the intermediate section to the rear end of the panel reinforcement.

12. The vehicle door structure according to claim 1, wherein the truss section includes a triangular opening surrounded by the front-rear frame section.

13. The vehicle door structure according to claim 5, wherein the U-shape of the first frame section is formed by an upper wall extending inwardly in the vehicle width direction, an inner wall that extends downward in the vehicle width direction from an inner end of the upper wall and a lower wall that extends outward in the vehicle width direction from a lower end of the inner wall.

14. A vehicle door structure comprising:
a door outer panel including
a projected section that is projected outward in a vehicle width direction,
a recessed section that is separated from the projected section and recessed inward in the vehicle width direction, and
a boundary section between the projected section and the recessed section; and
a panel reinforcement fixed to an inner surface in the vehicle width direction of the door outer panel, wherein
the panel reinforcement includes:
a first frame section that extends in a vehicle front-rear direction; and
a second frame section at a position that overlaps the boundary section in a vehicle side view and is configured to transmit a load to the first frame section when the load in an inward direction of the vehicle width direction is applied to the boundary section, wherein the first frame section and the second frame section each overlap the recessed section in a vehicle side view.

* * * * *